United States Patent Office 3,538,138
Patented Nov. 3, 1970

3,538,138
SUBSTITUTED OXYETHYL THIOSULFONATES
Joseph E. Dunbar, Midland, Mich., assignor to The Dow
Chemical Company, Midland, Mich., a corporation of
Delaware
No Drawing. Filed Oct. 12, 1967, Ser. No. 674,770
The portion of the term of the patent subsequent
to Aug. 22, 1984, has been disclaimed
Int. Cl. C07c 143/68
U.S. Cl. 260—453                                     5 Claims

ABSTRACT OF THE DISCLOSURE

Substituted oxyethyl thiolsulfonates corresponding to the formula

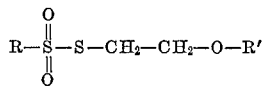

in which R represents lower alkyl, naphthyl, substituted naphthyl, phenyl and substituted phenyl and R' represents lower alkyl, phenyl and substituted phenyl. The compounds are useful as antimicrobials and parasiticides.

---

The present invention is directed to substituted oxyethyl thiolsulfonates corresponding to the formula

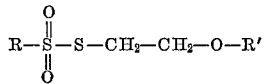

In this and succeeding formulas, R represents lower alkyl, naphthyl, substituted naphthyl, phenyl and substituted phenyl and R' represents lower alkyl, phenyl and substituted phenyl. In the present specification and claims, substituted-phenyl represents lower alkyl-phenyl, halophenyl and lower alkoxy-phenyl, while substituted naphthyl represents lower alkyl-naphthyl, halonaphthyl and lower alkoxy-naphthyl. The term arene is sometimes hereinafter used for phenyl, substituted phenyl, naphthyl and substituted naphthyl. The expressions lower alkyl and lower alkoxy are employed in the specification and claims to represent lower alkyl and lower alkoxy groups containing from 1, to 2, to 3, to 4 carbon atoms, inclusive, such as methyl, methoxy, ethyl, ethoxy, propyl, propoxy, isopropyl, n-butyl, n-butoxy, sec.-butyl, sec.-butoxy, tert.-butyl and tert.-butoxy. The expression halo is employed to represent chlorine, bromine, fluorine or iodine. The new compounds of the present invention are liquids and solids which are of low solubility in water and of high solubility in many organic solvents. The compounds are useful as broad spectrum antimicrobials and parasiticides and are adapted to be employed for the control of a number of bacterial, plant and fungal organisms such as *Bacillus subtilis, Mycobacterium phlei, Staphylococcus aureus, Salmonella typhosa, Trichophyton mentagrophytes, Aerobacter aerogenes, Pseudomonas aeruginosa, Candida pelliculosa, Pullularia pullulans, Aspergillus terreus, Candida albicans, Pseudomonas sp.* strain 10, *Escherichia coli, Rhizopus nigricans,* rice blast, crabgrass, goldfish, and round worm spp.

In producing the novel thiolsulfonates of the present invention, a 2-alkoxyethyl or a 2-aryloxyethyl alkylating agent, e.g., a 2-chloro- or 2-bromoethyl ether or a 2-alkoxyethyl or a 2-aryloxyethyl substituted sulfonate, e.g., 2-methoxyethyl p-toluenesulfonate, 2-methoxyethyl p-benzenesulfonate or 2-phenoxyethyl methanesulfonate corresponding to the formula

X—CH₂—CH₂—O—R' wherein X represents chlorine, bromine, arene sulfonate, substituted arene sulfonate or alkane sulfonate, is reacted with an alkali metal or ammonium salt of a thiosulfonic acid corresponding to the formula

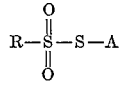

wherein A represents alkali metal or ammonium to produce the desired product and the alkali metal or ammonium halide or sulfonate byproduct. The reaction is conveniently carried out in a polar organic solvent such as ethanol, isopropanol, acetone, acetonitrile, dimethylformamide, methanol, aqueous acetone, aqueous ethanol, or aqueous methanol. The amounts of the reactants to be employed are not critical, some of the desired product being obtained when employing any proportions of the reactants. However, the reaction consumes the reactants in equimolar proportions and the use of the reactants in such proportions is preferred.

The reaction takes place smoothly at temperatures at which the alkali metal or ammonium halide or sulfonate of reaction is formed and conveniently at temperatures between 30° and 140° C. In a preferred procedure, the reaction is carried out at temperatures between 60° and 90° C. In such a preferred method, it is oftentimes convenient to operate at the boiling temperature of the reaction mixture and under reflux. Cessation in the formation of the halide or sulfonate of reaction is evidence of completion of the reaction.

In carrying out the reaction, the reactants are mixed and contacted together in any convenient fashion and the resulting mixture maintained for a period of time in the reaction temperature range to insure completion of the reaction. Following the reaction, the reaction mixture is processed by conventional procedures to obtain the desired product. In some instances the alkali metal or ammonium halide or sulfonate of reaction precipitates in the reaction mixture as a crystalline solid. In such cases, the reaction mixture is filtered while hot to remove the solid byproduct and the filtrate is then cooled. During the cooling the desired product precipitates in the filtrate as a crystalline solid or forms an organic oil layer which is collected by decantation or filtration. In another convenient procedure, the organic reaction medium can be removed by evaporation under reduced pressure, leaving the desired product as a residue. This residue can then be washed with water to remove the byproduct salt. The product thus obtained can be employed in pesticidal applications or further purified by conventional procedures such as recrystallization or washing with an organic solvent.

Representative thiosulfonic acid salts include potassium methanethiosulfonate, sodium 2,4 - dichlorobenzenethiosulfonate, sodium 3,4,5 - trimethylbenzenethiosulfonate, potassium 2,4-diethylbenzenethiosulfonate, potassium 4-tert.-butylbenzenethiosulfonate, sodium 3,5 - difluorobenzenethiosulfonate, potassium benzenethiosulfonate, potassium 4 - iodobenzenethiosulfonate, sodium 5 - ethoxybenzenethiosulfonate, potassium 3,5 - dimethoxybenzenethiosulfonate, sodium 3,5,6-tribromobenzenethiosulfonate, potassium 3,4-diiodobenzenethiosulfonate, sodium 2,3,4,5,6-pentamethylbenzenethiosulfonate and sodium 2,3,4,5,6-pentachlorobenzenethiosulfonate.

Representative 2-haloethyl ethers include 2-chloroethyl 4-chlorophenyl ether, 2-bromoethyl 3,4,5-tribromophenyl ether, 2-bromoethyl n-butyl ether, 2-bromoethyl phenyl ether, 2-bromoethyl ethyl ether, 2-chloroethyl 4-n-butoxyphenyl ether, 2-chloroethyl 3,5-diethoxyphenyl ether and 2-chloroethyl 2,3,4-trifluorophenyl ether.

Representative 2-alkoxyethyl and 2-aryloxyethyl substituted sulfonates include 2-methoxyethyl p-toluenesulfonate, 2-methoxyethyl p-benzenesulfonate, 2-ethoxyethyl p-bromobenzenesulfonate, 2 - phenoxyethyl methanesulfonate, p-methylphenoxyethyl p - chlorobenzenesulfonate, o-chlorophenoxyethyl p-toluenesulfonate and m-ethoxyphenoxyethyl n-butanesulfonate.

The oxyethyl thiolsulfonates of this invention are much less odoriferous than the thioethyl thiolsulfonates of U.S. Pat. 3,337,599, and consequently are useful and more desirable in those applications where a less odoriferous compound is wanted, e.g., in soaps, shampoos, inks, adhesives, paints, cellulosic products, textiles and the like. Also, ethers are known to be not generally reactive toward oxidizing agents, whereas thioethers are easily oxidized to convert them to sulfoxides which can be further oxidized to sulfones.

The following examples are merely illustrative of representative specific embodiments and are not intended to be limiting of the invention claimed.

EXAMPLE 1

2-phenoxyethyl methanethiolsulfonate

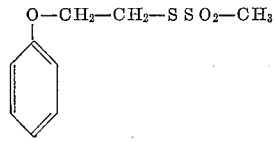

A mixture of 100.0 g. (0.498 mole) of β-bromophenetole and 74.6 g. (0.498 mole) of potassium methanethiosulfonate in 1,500 ml. of acetonitrile was boiled under reflux with stirring for seven hours. The insoluble potassium bromide byproduct was removed from the hot solution by filtration. The filtrate was concentrated to give a cloudy yellow oil. Vacuum distillation left a residue of yellow oil which, upon cooling, crystallized. The crude product was recrystallized once from ethanol and three times from isopropanol to give the pure product as fluffy white crystals, melting point 45–46.5° C.

*Analysis.*—Calcd. for $C_9H_{12}O_3S_2$ (percent): C, 46.52; H, 5.21; S, 27.60. Found (percent): C, 46.4; H, 4.94; S, 27.53.

EXAMPLE 2

2-phenoxyethyl benzenethiolsulfonate

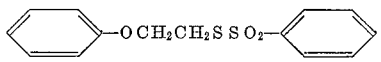

A mixture of 50.0 g. (0.250 mole) of β-bromophenetole and 53.1 g. (0.250 mole) of potassium benzenethiosulfonate in 500 ml. of ethanol was heated with stirring under reflux for 17 hours. The reaction mixture was then cooled and filtered to remove the byproduct potassium bromide. The filtrate was evaporated to dryness in vacuo to give a tan, solid residue, which, upon recrystallization from isopropanol and two recrystallizations from ethanol, gave the pure 2-phenoxyethyl benzenethiolsulfonate as colorless crystals, melting point 53–55° C.

*Analysis.*—Calcd. for $C_{14}H_{14}O_3S_2$ (percent): C, 57.12; H, 4.79; S, 21.78. Found (percent): C, 57.2; H, 4.69; S, 21.8.

EXAMPLE 3

2-ethoxyethyl methanethiolsulfonate $$CH_3CH_2OCH_2CH_2SSO_2CH_3$$

A mixture of 50.0 g. (0.327 mole) of 2-bromoethyl ethyl ether and 49.2 g. (0.327 mole) of potassium methanethiosulfonate in 500 ml. of ethanol was heated under reflux with stirring for 44 hours. The reaction mixture was then cooled and filtered to remove the byproduct potassium bromide. The filtrate was evaporated in vacuo to give the crude product as a brown oil. Fractional distillation gave the pure product as a colorless oil, boiling point 103–105° C./0.8 mm., $n_D^{25}$ 1.4944.

*Analysis.*—Calcd. for $C_5H_{12}O_3S_2$ (percent): C, 32.59; H, 6.57; S, 34.80. Found (percent): C, 32.8; H, 6.67; S, 35.0.

EXAMPLE 4

2-Methoxyethyl methanethiolsulfonate $$CH_3OCH_2CH_2SSO_2CH_3$$

A mixture of 69.1 g. (0.300 mole) of 2-methoxyethyl p-toluenesulfonate and 45.1 g. (0.300 mole) of potassium methanethiosulfonate in 400 ml. of dimethylformamide was heated with stirring at steam bath temperature for 15 hours. The cooled reaction mixture was poured into water and the resulting mixture extracted with methylene chloride. The combined extract was washed with water and dried over anhydrous magnesium sulfate. The methylene chloride was removed by distillation followed by fractionation of the residual oil (containing dimethylformamide). The pure product was obtained as a colorless oil, boiling point 97–98° C./0.5 mm., $n_D^{25}$ 1.5018.

*Analysis.*—Calcd. for $C_4H_{10}O_3S_2$ (percent): C, 28.22; H, 5.93; S, 37.66. Found (percent): C, 28.2; H, 6.26; S, 37.7.

The compounds of the present invention or compositions containing the same as active ingredients, can be applied to pests and their habitats and incorporated in food in antimicrobial and parasiticidal amounts to obtain excellent controls and kills of many organisms. Additionally, the compounds can be included in inks, adhesives, soaps, shampoos, shaving creams, ointments, lotions, aerosols, cutting oils, oil or latex paints, cellulosic materials such as paper pulp, wood pulp, textiles, powders, e.g., talcum powders, solid and liquid disinfectants and cleaning compositions, air filter coating compositions, water supplies and water filters, to prevent mold, mildew and slime formation, and the degradation of such products resulting from microbial and parasitic attack.

The compounds conveniently can be employed in liquid or dust compositions. In such usage, the compounds are modified with one or a plurality of adjuvants or helpers including water, organic solvents, petroleum oils, petroleum distillates, naphthas or other liquid carriers, surface active dispersing agents and finely divided solids such as chalk, talc or bentonite. Depending upon the concentration of the active compounds of this invention in such formulations, the augmented compositions are adapted to be distributed on plants or plant parts, or in soil, inks, soaps, cosmetics, detergents, shampoos, aerosols, disinfectants, adhesives, cutting oils, paints, textiles, paper, cardboard, lumber, white or cooling waters, or to be employed as concentrates and subsequently diluted with additional liquid or solid adjuvants to produce the ultimate treating compositions.

The exact concentration of the novel compounds of this invention to be employed in the treating compositions is not critical and may vary considerably provided an antimicrobial or parasiticidal amount of effective agent is supplied on the plant or plant part or the soil, ink, adhesive, cutting oil, textile, paper, wood and so forth. The concentration of toxicant in liquid compositions generally is from about 1 to 50 percent by weight. Concentrations up to 95 percent by weight oftentimes are conveniently employed. In dusts, the concentration of the toxicant can be from about 1 to 10 percent by weight. In compositions to be employed as concentrates, the toxicant can be present in a concentration of from 5 to 98 percent by weight.

In representative operations, the product of Example 3 gave complete control of *Aerobacter aerogenes, Bacillus subtilis, Candida pelliculosa, Escherichia coli, Salmonella typhosa, Candida albicans, Pullularia pullulans, Trichophyton mentagrophytes, Aspergillus terreus, Rhizopus nigricans, Staphylococcus aureus* and *Mycobacterium phlei* at concentrations of 100 parts per million by weight in agar culture medium. *Pseudomonas sp.* strain 10 and *Pseudomonas aeruginosa* required a concentration of 500 p.p.m. of the same compound in the same medium for complete control. In further operations, the compound of Example 4 gave complete control of all but one of the organisms against which the compound of Example 3 was effective and at the same concentrations in the same agar culture medium, except that *Aerobacter aerogenes* required a concentration of 500 p.p.m. for complete control. At a concentration of 2 p.p.m. in water, the compound of Example 4 gave 100 percent kill of goldfish in 24 hours. The compound of Example 4 was dispersed in feces from calves infested with round worm spp. and having a high ova count at a concentration of 300 p.p.m. and incubated at 26–28° C. for five days. Examination of the culture medium with a microscope showed no larvae. A control containing none of the compound of Example 4 when similarly cultured showed a high concentration of round worm spp. larvae. The compound of Example 4 was not tested against *Mycobacterium phlei*.

In still further operations, the compound of Example 2 gave complete control of *S. aureus, C. albicans, T. mentagrophytes, B. subtilis, A. terreus, C. pelliculosa, P. pullulans, M. phlei* and *R. nigricans* at concentrations of 100 p.p.m. and *S. typhosa* at a concentration of 500 p.p.m. in agar culture medium.

The thiosulfonates employed as starting materials in accordance with the teachings of the present invention can be prepared in accordance with known methods. In one method, potassium hydrosulfide (KSH) is reacted with a suitable lower alkane-, benzene-, lower alkoxybenzene-, halobenzene, or lower alkylbenzenesulfonyl chloride. Representative halides include 3,5-dimethylbenzenesulfonyl chloride, 4 - chloro-2-methylbenzenesulfonyl chloride, 2,4,5-trichlorobenzenesulfonyl chloride, n-propanesufonyl chloride, n-butanesulfonyl chloride and 2-propanesulfonyl chloride. In a convenient procedure, the reaction is carried out by adding the sulfonyl halide to an aqueous or alcoholic potassium hydroxide solution saturated with $H_2S$. Upon completion of the reaction, the desired starting materials are separated by conventional procedures.

The 2-haloethyl ethers employed as starting materials in the present application are prepared by known techniques. In a representative known technique a sodium alkoxide or aryloxide corresponding to the formula R′—O—Na is reacted with 2-bromoethanol to produce a 2-alkoxy- or 2-aryloxy ethanol.

The 2-alkoxyethyl and 2-aryloxyethyl substituted sulfonates are also prepared by known techniques, e.g., by reaction of 2-aryloxyethanols or 2-alkoxyethanols with an alkane or arene sulfonyl chloride.

I claim:
1. The compound corresponding to the formula

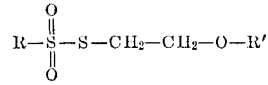

wherein R represents lower alkyl, naphthyl, lower alkylnaphthyl, halonaphthyl or lower alkoxynaphthyl, phenyl, lower alkylphenyl, halophenyl or lower alkoxyphenyl and R′ represents lower alkyl, phenyl, lower alkylphenyl, halophenyl or lower alkoxyphenyl.

2. The compound claimed in claim 1 wherein R represents methyl and R′ represents phenyl.

3. The compound claimed in claim 1 wherein each of R and R′ represents phenyl.

4. The compound claimed in claim 1 wherein R represents methyl and R′ represents ethyl.

5. The compound claimed in claim 1 wherein each of R and R′ represents methyl.

References Cited
UNITED STATES PATENTS

| | | | |
|---|---|---|---|
| 3,284,481 | 11/1966 | Dunbar | 260—453 |
| 3,337,599 | 8/1967 | Dunbar | 260—453 |
| 3,338,945 | 8/1967 | Dunbar | 260—453 |
| 3,346,592 | 10/1967 | Dunbar | 260—453 X |
| 3,365,480 | 1/1968 | Cobb et al. | 260—453 |

LEWIS GOTTS, Primary Examiner

G. HOLLRAH, Assistant Examiner

U.S. Cl. X.R.

11—103; 106—20; 162—161; 252—48.2, 106, 107; 260—502.6, 999; 424—303